US008126768B2

(12) United States Patent
Mehrotra et al.

(10) Patent No.: US 8,126,768 B2
(45) Date of Patent: Feb. 28, 2012

(54) APPLICATION CHANGE REQUEST TO DEPLOYMENT MATURITY MODEL

(75) Inventors: Vibhav Mehrotra, Oak Park, IL (US); Prajval Parthasarathy, Duluth, GA (US)

(73) Assignee: Computer Associates Think, Inc., Islandia, NY (US)

( * ) Notice: Subject to any disclaimer, the term of this patent is extended or adjusted under 35 U.S.C. 154(b) by 1044 days.

(21) Appl. No.: 11/224,023

(22) Filed: Sep. 13, 2005

(65) Prior Publication Data

US 2007/0061191 A1    Mar. 15, 2007

(51) Int. Cl.
    G06Q 10/00    (2006.01)
(52) U.S. Cl. ............ 705/7.36; 705/7.23; 705/7.38; 717/101; 717/104
(58) Field of Classification Search .......... None
    See application file for complete search history.

(56) References Cited

U.S. PATENT DOCUMENTS 5,233,513 A * 8/1993 Doyle .................. 705/7.11

(Continued)

OTHER PUBLICATIONS

The Development of a Best Practice Model for Change Management European Management Journal vol. 15, No. S, pp. 537-545, 1997.*

(Continued)

*Primary Examiner* — Lynda Jasmin
*Assistant Examiner* — Gurkanwaljit Singh
(74) *Attorney, Agent, or Firm* — Pillsbury Winthrop Shaw Pittman LLP

(57) ABSTRACT

The invention provides a system and method of improving change management structure of an organization, wherein change management structure includes process definitions for managing change requests to software applications. In one embodiment, the invention may include receiving current change management information regarding an organization. A current maturity level for the organization may then be determined from a hierarchy of predefined change management maturity levels. A target change management maturity level may then be determined from the hierarchy. One or more improvement operations may then be defined that, when performed, shift the organization to the target change management process maturity level. The one or more improvement operations may then be performed.

29 Claims, 15 Drawing Sheets

U.S. PATENT DOCUMENTS

| | | | |
|---|---|---|---|
| 5,960,420 A | 9/1999 | Leymann et al. | 707/1 |
| 5,974,392 A | 10/1999 | Endo | 705/8 |
| 6,256,773 B1* | 7/2001 | Bowman-Amuah | 717/121 |
| 6,278,977 B1 | 8/2001 | Agrawal et al. | 705/7 |
| 6,308,162 B1 | 10/2001 | Ouimet et al. | 705/7 |
| 6,424,979 B1* | 7/2002 | Livingston et al. | 715/206 |
| 6,519,571 B1* | 2/2003 | Guheen et al. | 705/14 |
| 6,519,642 B1 | 2/2003 | Olsen et al. | 709/227 |
| 6,662,355 B1 | 12/2003 | Caswell et al. | 717/103 |
| 6,876,993 B2 | 4/2005 | LaButte et al. | 706/47 |
| 6,895,382 B1 | 5/2005 | Srinivasan et al. | 705/7 |
| 6,895,403 B2 | 5/2005 | Cardwell et al. | 707/10 |
| 6,959,268 B1* | 10/2005 | Myers, Jr. et al. | 703/6 |
| 6,990,482 B1 | 1/2006 | Piotrowski et al. | 707/3 |
| 7,035,809 B2* | 4/2006 | Miller et al. | 705/7.23 |
| 7,069,179 B2 | 6/2006 | Kim et al. | 702/182 |
| 7,069,234 B1* | 6/2006 | Cornelius et al. | 705/26 |
| 7,197,520 B1 | 3/2007 | Matthews et al. | 707/204 |
| 7,290,275 B2* | 10/2007 | Baudoin et al. | 726/1 |
| 7,315,826 B1* | 1/2008 | Guheen et al. | 705/7.29 |
| 7,350,138 B1 | 3/2008 | Swaminathan et al. | 715/500 |
| 7,421,617 B2 | 9/2008 | Anderson et al. | 714/15 |
| 7,447,729 B1* | 11/2008 | Thakur et al. | 709/200 |
| 7,703,070 B2* | 4/2010 | Bisceglia | 717/101 |
| 7,734,594 B2 | 6/2010 | Wang | 707/644 |
| 7,747,577 B2 | 6/2010 | Cannon et al. | 707/650 |
| 7,752,070 B2 | 7/2010 | Hatcher et al. | 705/11 |
| 7,752,437 B1 | 7/2010 | Thakur et al. | 713/165 |
| 2001/0052108 A1* | 12/2001 | Bowman-Amuah | 717/1 |
| 2002/0029319 A1 | 3/2002 | Robbins et al. | 711/114 |
| 2002/0065696 A1 | 5/2002 | Hack et al. | 705/7 |
| 2002/0065698 A1 | 5/2002 | Schick et al. | 705/8 |
| 2002/0144256 A1 | 10/2002 | Budhiraja et al. | 717/174 |
| 2002/0174045 A1 | 11/2002 | Arena et al. | 705/36 |
| 2002/0188927 A1* | 12/2002 | Bellagamba | 717/101 |
| 2003/0093521 A1 | 5/2003 | Schlonski et al. | 709/224 |
| 2003/0110067 A1* | 6/2003 | Miller et al. | 705/8 |
| 2003/0171976 A1* | 9/2003 | Farnes et al. | 705/10 |
| 2003/0172020 A1 | 9/2003 | Davies et al. | 705/36 |
| 2003/0216926 A1* | 11/2003 | Scotto et al. | 705/1 |
| 2004/0010709 A1* | 1/2004 | Baudoin et al. | 713/201 |
| 2004/0015377 A1* | 1/2004 | Hostetler | 705/7 |
| 2004/0039619 A1 | 2/2004 | Zarb | 705/7 |
| 2004/0054545 A1 | 3/2004 | Knight | 705/1 |
| 2004/0078654 A1 | 4/2004 | Holland et al. | 714/13 |
| 2004/0093244 A1 | 5/2004 | Hatcher et al. | 705/7 |
| 2004/0107125 A1* | 6/2004 | Guheen et al. | 705/7 |
| 2004/0193476 A1* | 9/2004 | Aerdts | 705/10 |
| 2004/0225549 A1 | 11/2004 | Parker et al. | 705/8 |
| 2005/0043976 A1 | 2/2005 | Leehman | 705/7 |
| 2005/0108043 A1 | 5/2005 | Davidson | 705/1 |
| 2005/0114829 A1* | 5/2005 | Robin et al. | 717/101 |
| 2005/0120032 A1 | 6/2005 | Liebich et al. | 707/100 |
| 2005/0125272 A1* | 6/2005 | Hostetler | 705/7 |
| 2005/0159973 A1 | 7/2005 | Krause et al. | 705/1 |
| 2005/0267771 A1* | 12/2005 | Biondi et al. | 705/1 |
| 2006/0045039 A1 | 3/2006 | Tsuneya et al. | 370/318 |
| 2006/0064481 A1* | 3/2006 | Baron et al. | 709/224 |
| 2006/0069540 A1 | 3/2006 | Krutz | 703/22 |
| 2006/0080656 A1* | 4/2006 | Cain et al. | 717/174 |
| 2006/0117012 A1 | 6/2006 | Rizzolo et al. | 707/9 |
| 2006/0161883 A1 | 7/2006 | Lubrecht et al. | 717/104 |
| 2007/0021967 A1 | 1/2007 | Jaligama et al. | 705/1 |
| 2007/0027734 A1 | 2/2007 | Hughes | 705/7 |
| 2007/0043538 A1 | 2/2007 | Johnson et al. | 702/188 |
| 2007/0061180 A1 | 3/2007 | Offenberg | 705/8 |
| 2007/0061191 A1* | 3/2007 | Mehrotra et al. | 705/11 |
| 2007/0100892 A1 | 5/2007 | Kephart et al. | 707/200 |
| 2007/0101167 A1 | 5/2007 | Lindley et al. | 713/300 |
| 2008/0086357 A1 | 4/2008 | Choubey et al. | 705/10 |
| 2008/0114700 A1 | 5/2008 | Moore et al. | 705/36 R |
| 2008/0114792 A1 | 5/2008 | LaMonica | 707/100 |
| 2010/0114833 A1 | 5/2010 | Mu | 707/650 |

OTHER PUBLICATIONS

Preparing the Organizational 'Soil' for Measurable and Sustainable change: Business Value Management and Project Governance Journal of Change Management, vol. 4, No. 1, 45-62, Mar. 2004 (Received Jun. 2003).*

Improving the Change Management Process, by Angela Clarke, 1998—Thesis.*

"Relationships between organizational properties and organizational effectiveness in Three Types of Nonprofit Human Service Organizations" Hillel Schmid Public Personnel Management; Fall 2002; 31, 3; ABI/INFORM Global p. 377.*

Prosci's Change Management Maturity Model Prosci © 2004.*

"Using OR for diagnosis and facilitation in change programmes: a university application" MG Nicholls, BJ Cargill and KS Dhir Journal of the Operational Research Society (2004) 55, 440-452.*

Paulk, M.C.; Curtis, B.; Chrissis, M.B.; Weber, C.V.; , "Capability maturity model, version 1.1," Software, IEEE , vol. 10, No. 4, pp. 18-27, Jul. 1993.*

Diaz, M.; Sligo, J.; , "How software process improvement helped Motorola," Software, IEEE , vol. 14, No. 5, pp. 75-81, Sep./Oct. 1997.*

Jan Bosch, Maturity and Evolution in Software Product Lines: Approaches, Artefacts and Organization, Software Product Lines Lecture Notes in Computer Science, 2002, vol. 2379/2002, 247-262.*

Paulk, Mark C. "Key Practices of the Capability Maturity Model" Software Engineering Institute, Carnegie Mellon University, Technical Report CMU/SEI-93-TR-025, Feb. 1993.*

Herbsleb, James et al., "Software quality and the Capability Maturity Model" Magazine Communications of the ACM, vol. 40 Issue 6, Jun. 1997.*

"Delivering Intelligence for Business Value and Insight", Copyright 2002 Computer Associates International, Inc., MP160920902, 4 pages.

Mehrotra, Vibhav, "Growing into Release Management via an Iterative Approach", Emphasis on Enterprise, *Programmer's Paradise Magazine*, Apr. 2005, pp. 24-25.

Kakita, Howard H., et al., "Improving Process Maturity to Compete in the Desktop Printer Market", *PDMA Visions Magazine*, Apr. 1998, pp. 1-8.

Clarke, Nick, "Asset Management and Monitoring", Tessella Support Services PLC, Issue V1.R0.M1, Oct. 2005, 21 pages.

Anonymous, "Enterprise Asset Management Systems", *Work Study*, vol. 51, No. 6/7, ABI/INFORM Global, 2002, pp. 320-328 (2 pages).

* cited by examiner

Maturity Level: Active (Level 1)

Other Characteristics:

- Reactive processes and Unmanaged goals
- Processes for Change not supported by tools
- Inconsistent quality of outputs
- Controls are manual/paper based
- Information for audits takes time and effort to compile (preparation for audit is longer)
- Changes to applications can be made in multiple methods
- File changes are manually mapped to business requests

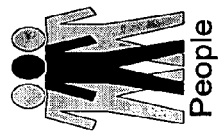

People
- End Users
- Business Unit Owners

Process
- Define Application Development Change Process
- Develop Basic Application Development Life Cycle
- Identify & Control Artifacts under Change Management
- Establish Quality Control Procedures

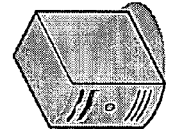

Technology
- Operating Systems
- Business Applications

FIG. 1B

Maturity Level: Efficient (Level 2)

Other Characteristics:

- Application change is automatically tied to a business driver or business requirement

- Change Requests are Flexible (individual changes can be moved - promoted or demoted - throughout the application development lifecycle; changes can be grouped and moved as a release)

- Controls are automated and approvals/notifications are electronic

- Managing builds (executables) are tied to source code changes automatically

- Application development is repeatable (consistent processes are embedded into the development team)

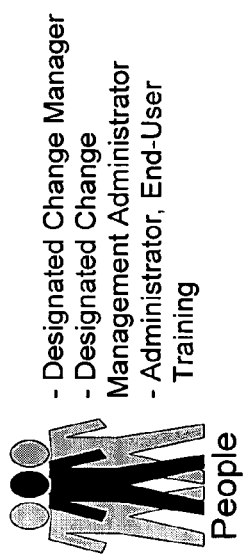

People
- Designated Change Manager
- Designated Change Management Administrator
- Administrator, End-User Training Process
- Project Level Processes Defined
- RFC/Change Request Creation
- Application Development code reviews
- Promotion Approvals
- Establish Roles and Responsibilities
- Testing
- Automated Communications and Workflow
- Build Process

Technology
- Change Management Solution Deployed
- Change Management Solution Administration and Maintenance
- Build Solution Deployed

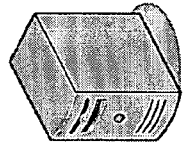

FIG. 1D

Maturity Level: Responsive (Level 3)

Other Characteristics:

- Consistent development methodology exists throughout the enterprise/organization (mainframe and distributed change management)
- "Best-in-class" service support processes that enable faster response to outage requests
- Integrated development and operations lifecycles
- Automated deployments speed up the release management process and are scalable for enterprise levels
- Enables the organization to support compressed application development life cycles

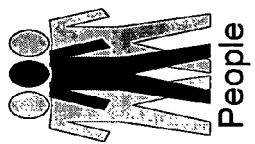

People
- Designated Incident Manager
- Designated Release Manager
- Administrator, End-User and Manager Training

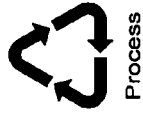

Process
- Define Incident Management Process
- Define Release Management Process
- Integrate between Incident, Change, Build and Release Management.
- Integrated Mainframe and Distributed Changes

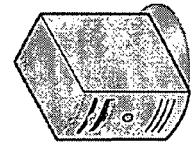

Technology
- Integrated Incident, Build, Change and Release Solution Deployed
- Integrated Enterprise Change Management Solution Deployed

FIG. 1F

Maturity Level: Business-Driven (Level 4)

Other Characteristics:

- Suitable for highly secure environments

- Supports "High Availability," service level agreements (service level monitoring for availability and automatic fault identification and logging; real time status on all changes)

- Automatic provisioning/recovery/rollback of changes during deployment

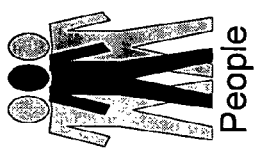

People
- End User Training
- Designated System Administrator
- Designated Security Administrator

Process
- Support business impact analysis
- Industry or Government Compliance
- Centralized Change, Incident, Build and Release Management Repository
- Centralized Knowledge Library
- Audit compliant Production system
- Automated Backup and Rollback System

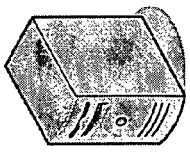

Technology
- Dynamic Reporting of Change, Incident, Build and Releases (Dashboard)
- Integrated Release and Backup Solution Deployed
- Integrated Release and Security Solution Deployed
- Integrated Production Management and Incident Management

FIG. 1H

EDM³

Asset/Discovery to Vulnerability Remediation

Maturity Level = 1.3          Lowest = 0; Highest = 5

| Maturity | Level 1<br>Active | Level 2<br>Efficient | Level 3<br>Responsive | Level 4<br>Business Driven |
|---|---|---|---|---|
| Measure: | 5 | 0 | 0 | 0 |
| Sub - Process | IT organization works with the user community to identify security violations of the distributed computing environment. | A comprehensive vulnerability and threat management policy and procedures manual has been distributed to management and senior staff and it is periodically updated. | Vulnerabilities and Threat violations are tracked and documented. | Security Vulnerability Detection and Threat Detection systems will be proactively able to address problems with leading edge solutions through internal research. |
| | Security violations are detected and handled on a group-by-group or technology-by-technology basis. | Vulnerability Detection Systems (Vulnerability Management) and Intrusion Detection Systems (Threat Management) are documented and managed by the appropriate IT individuals. | The same Vulnerability Detection and Threat Detection process is used for throughout the organization and for each business unit supported, and variations of the process required to address specific needs are well documented and understood. | Quantitative metrics (such as Incident rate, response and recovery time) have been established, are collected at regular intervals, and reports generated and distributed to appropriate individuals to help measure the benefits of vulnerability and threat detection. |
| | IT personnel is responsible for the Vulnerability Detection and Threat Detection process itself, and they actively monitor and correct the process when it is not achieving the desired results. | Vulnerability Detection and Threat Detection is performed and the results checked for accuracy by IT personnel responsible for day to day security operations. | The process for Vulnerability Detection and Threat Detection is regularly reviewed by IT and business unit management. | Security incident reports are used to help develop realistic security policy and access control goals. These results and goals are known by all individuals involved in delivering IT services. |
| | A firewall is implemented to protect against unauthorized activity from the internet | Individuals responsible for detecting vulnerabilities and threats are adequately trained and skilled. | Regular, periodic Attack and Penetration Analysis results are verified against current detection systems and procedures. | Outside vulnerability reports, (i.e., CERT and vendor) and resolutions are used to prevent security violations and performance levels from falling below |

FIG. 3

APPLICATION CHANGE REQUEST TO DEPLOYMENT MATURITY MODEL

FIELD OF THE INVENTION

The invention relates to a system and method for assessing a current change management maturity level of an organization, devising strategies for improving the maturity level, and implementing those strategies to move the organization to a higher maturity level.

BACKGROUND OF THE INVENTION

In the information technology industry, ever-advancing products, processes, and know-how places business organizations and other organizations involved with software development in a constantly shifting, extremely competitive marketplace. This may be so regardless of whether the organization is private or governmental, large or small. As such, many organizations require at least some form of change management processes to direct the management of incidents, upgrades, problems, or other matters related to the organization's software applications, regardless of whether or not these matters require changes to the underlying code of software applications.

In an organization's software development processes, development-oriented software applications are themselves utilized for design, coding, building, testing, implementation, change management or other stages of software development. Traditionally, improvement of an organization's software development processes involves addressing these development-oriented software applications. However, in many cases, upgrades or replacement of development-oriented software fails to provide the necessary improvement. This may be due to the fact that flaws exist in the development processes themselves, not simply the software used to execute the processes. This may be especially true in the area of software change management, wherein the process design plays a crucial role in the quality of incident or change handling. Other problems may also exist.

As such, there exists a need for systems and methods for assessing the status of an organization's software change management processes, producing a proposed scheme for improving those processes, and deploying that scheme to implement those processes. Implementation of these methods may improve the organization as a whole, provide additional return on investment, and keep the organization current, or ahead of existing market participants.

SUMMARY OF THE INVENTION

The invention solving these and other problems in the art relates to a system and method for assessing the software change management maturity level of an organization, devising strategies for improving the maturity level, and implementation of those strategies to move the organization to a higher maturity level.

An organization's change management may dictate the success of software development in the organization and may ultimately determine the quality of the organization's customer service and/or overall performance. As such, it may be necessary to periodically improve the change management processes of an organization to keep the processes current with, or even ahead of, established best practices or other standards.

Improving change management processes may initially involve defining a plurality of change management maturity levels that are arranged in a hierarchy (e.g., maturity level 1, level 2, etc.). These maturity levels may each define a set of processes for change management within a hypothetical organization operating at one of the plurality of maturity levels. These predefined maturity levels may be used in one or more ways as a guide for improving a real-world organization's change management processes.

Organizations involved in software development such as, for example, banks, insurance companies, research institutions, manufacturing companies, or other organizations typically have some established change management processes in place. In one embodiment of the invention, the established or current change management processes of an organization may be categorized or classified into one of the plurality of predefined change management maturity levels. As used herein, "change management" within an organization may include the processes that serve to control the implementation of changes to configuration items (CI) within the information technology infrastructure of the organization. Configuration items may include components of the information technology infrastructure or other items associated with that infrastructure such as, for example, source code files, executable programs, or other items. As used herein, "change requests" may include any logical construct used in an organization to process changes, including but not limited to: problems, incidents, requests for changes (RFCs), issues, enhancements, upgrades, or other changes associated with software application development, whether originating from internal sources (e.g., testers, quality control personnel, or other sources internal to an organization) or external sources (e.g., customers/software application end users, or other external sources).

In one embodiment, the plurality of predefined change management maturity levels may include, for example, an "Active" maturity level, an "Efficient" maturity level, a "Responsive" maturity level, a "Business-driven" maturity level, or other maturity levels. In some embodiments, these maturity levels may be organized as a hierarchy such as, for example, the Active maturity level being designated as the least developed or lowest maturity level, the Efficient maturity level being considered higher or more developed than the Active maturity level, the Responsive maturity level being considered higher or more developed than the Efficient maturity level, and the Business-Driven maturity level being designated as the highest or most developed maturity level. This hierarchical arrangement may reflect increasing levels of complexity, return on investment for the organization, or other qualities. These defined maturity levels and their arrangement in a hierarchy may provide a stepwise framework for advancing an organization's change management to a level that meets or exceeds industry best practices or other standards. It should be noted that the labels "Active," "Efficient," "Responsive," and "Business-Driven" are examples only. Other labels representing any number of hierarchically organized maturity levels may be used.

In one embodiment, the invention provides processes by which an organization's change management maturity level may be assessed and improved. In one embodiment, current change management information may be received from the organization. Current change management information may include data regarding the current people, processes, technology and/or other elements of the organization's current change management structure. A current change management maturity level may then be identified for the organization using the current change management process information. In one embodiment, the current change management maturity level may be identified using a "maturity model tool." The maturity model tool may include a set of questions and/or factors designed using the characteristics of the predefined maturity levels. These questions or factors, when answered in light of the received current change management information, may yield one or more numerical scores that are used to determine the current change management maturity level of the organization.

Once the current change management maturity level of an organization is established, a target change management maturity level may be identified. In some embodiments, the "target" change management maturity level may include the maturity level immediately above the current maturity level in the hierarchy.

In one embodiment, one or more improvement operations may be devised. The one or more improvement operations may be devised such that, when performed, the change management maturity level of the organization is shifted to the target maturity level. In some embodiments, the one or more improvement operations may be devised according to a solution architecture overview (SAO) and/or a solution architecture specification (SAS). The SAO may comprise an overview of the one or more improvement operations that may be presented to the organization prior to deciding whether or not to proceed with change management maturity level improvement. The SAS may comprise detailed documentation regarding the one or more improvement operations for raising the organization's maturity level, including: the steps that are to be taken to achieve the target maturity level; the software and other products that are going to be used in achieving the target maturity level; how those products are going to be installed; the processes to be implemented; the impact on the client in terms of people, process and technology; or other information.

The one or more improvement operations may then be performed (i.e., implementation of the solution detailed in the SAS), ultimately shifting the organization towards the higher change management maturity level. These operations may be preformed by personnel or infrastructure internal to the organization, by external personnel or infrastructure (e.g., consultants or other service providers), or by a combination of both.

In one embodiment, the purported benefits of the organization's ascension to a higher maturity level may be verified post-implementation. In one embodiment, this verification may be accomplished using previously defined critical success factors, which may be measured after one or more of the one or more operations have been performed. These critical success factors may be designed to determine the relative success or failure of the shift to the higher change management maturity level.

In some embodiments, one or more of the operations of the above described process may be repeated to shift the organization to an even higher change management maturity level. Thus, in an embodiment of the invention involving predefined change management maturity levels (e.g., Active, Efficient, Responsive, and Business-Driven), the invention may provide a stepwise solution for an organization to ultimately improve its change management from an outdated, inadequate, or otherwise undesirable change management configuration to a best-in-class configuration. For example, this stepwise solution may take the organization incrementally from an Active maturity level, to an Efficient maturity level, to a Responsive maturity level, to a Business-Driven maturity level. For each shift in maturity levels, iterations of some or all of the operations in the above described process may be utilized to move up incremental maturity levels until the ultimately desired maturity level is reached.

In one embodiment, the invention provides a computer-implemented system enabling performance of change management maturity level evaluation and improvement or other features, functions, or methods described herein. In another embodiment, the invention provides a computer readable medium for performing change management maturity level evaluation and improvement or other features, functions, or methods described herein.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 1B illustrates a list of elements of a change management process level according to an embodiment of the invention.

FIG. 1D illustrates a list of elements of a change management maturity level according to an embodiment of the invention.

FIG. 1F illustrates a list of elements of a change management maturity level according to an embodiment of the invention.

FIG. 1H illustrates a list of elements of a change management maturity level according to an embodiment of the invention.

FIG. 3 illustrates a maturity model tool according to an embodiment of the invention.

DETAILED DESCRIPTION

Figure 1A:
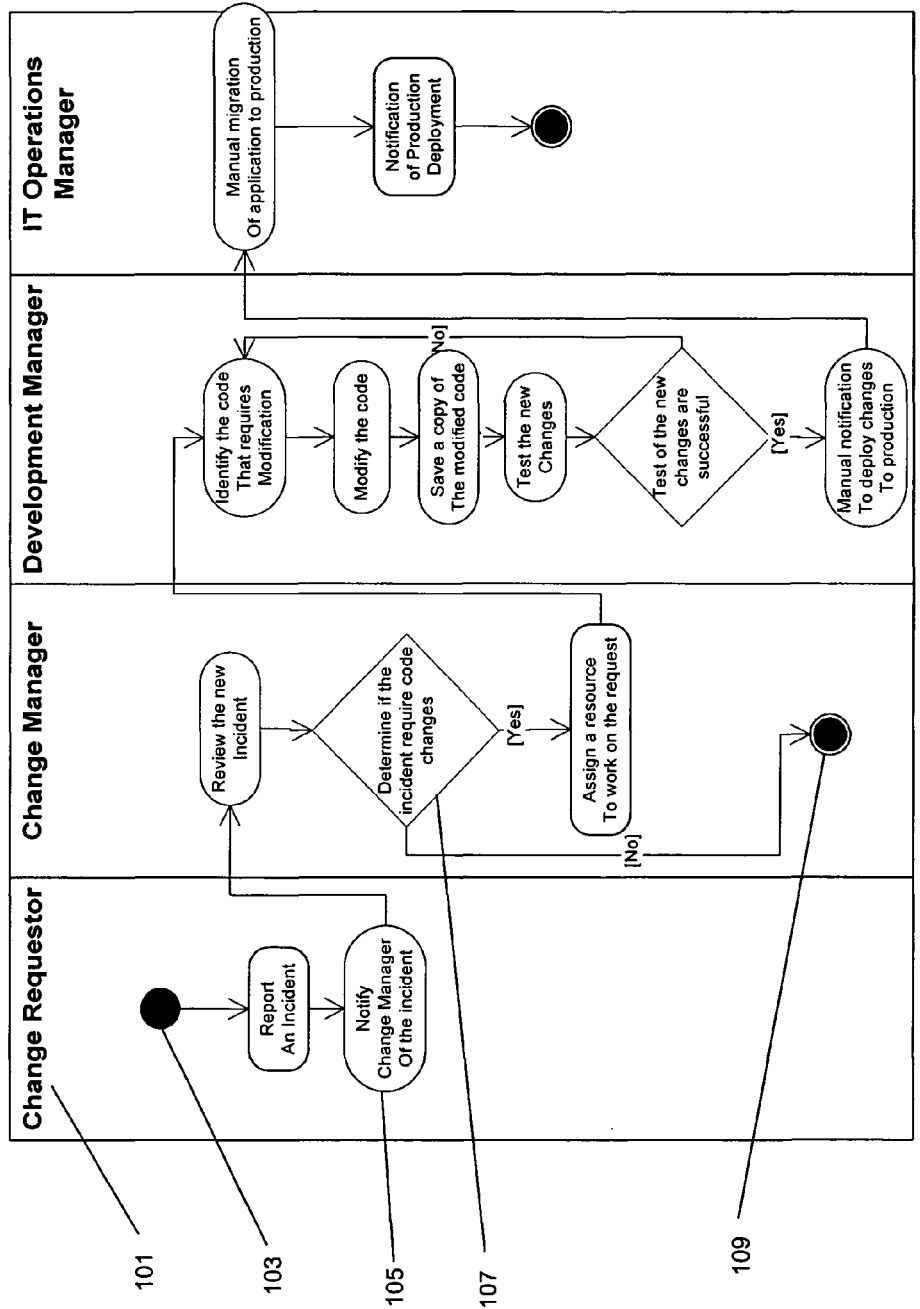
FIG. 1A illustrates a blueprint of a predetermined change management maturity level according to an embodiment of the invention.

This invention relates to a system and method for assessing the software change management maturity level of an organization, devising strategies for improving the maturity level, and implementing those strategies to move the organization to a higher maturity level.

In one embodiment of the invention, a plurality of change management maturity levels may initially be defined and arranged in a hierarchy (e.g., maturity level 1, level 2, etc.). These maturity levels may each define a set of processes for software application change management within a hypothetical organization. These maturity levels may be used in one or more ways as a guide for improving a real-world organization's change management processes.

In one embodiment, the plurality of predefined change management maturity levels may include, for example, an "Active" maturity level, an "Efficient" maturity level, a "Responsive" maturity level, a "Business-Driven" maturity level, or other maturity levels. In some embodiments, these maturity levels may be organized as a hierarchy such as, for example, an Active maturity level being designated as the least developed or lowest maturity level, an Efficient maturity level being considered higher or more developed than the Active maturity level, a Responsive maturity level being considered higher or more developed than the Efficient maturity level, and a Business-Driven maturity level being designated as the highest or most developed maturity level. This hierarchical arrangement may reflect increasing levels of complexity, return on investment for the organization, or other qualities. These defined maturity levels and their arrangement in a hierarchy may provide a stepwise framework for advancing an organization's change management to a level that meets or exceeds industry best practices.

In some embodiments, each of the maturity levels in the hierarchy may be assigned a numerical indicator indicative of each maturity level's place in the hierarchy such as, for example, level one for Active maturity levels, level 2 for Efficient maturity levels, level 3 for Responsive maturity levels, level 4 for Business-Driven maturity levels, or other numerical indicators for other maturity levels. These numerical indicators may be used in place of, or in addition to, any other nomenclature or labels associated with individual maturity levels. It should be noted that the labels "Active," "Efficient," "Responsive," and "Business-Driven" are examples only. Other labels representing any number of hierarchically organized maturity levels may be used.

Improvement of an organization's change management may involve moving the organization from a lower maturity level (e.g., Active) to a higher maturity level (e.g., Efficient). In some embodiments, the organization may be moved incrementally up several maturity levels (e.g., Active to Efficient, Efficient to Responsive, Responsive to Business-Driven). While movement of an organization incrementally up maturity levels may be optimal in many cases, movement up maturity levels while bypassing intermediate levels may also be possible (e.g., Efficient to Business-Driven). Additionally, because each maturity level may define a specific set of processes for change management within a hypothetical organization, not all organizations may desire, or be able to move to all maturity levels (e.g., a Business-Driven maturity level may not be appropriate for some organizations). As such, an organization may be moved to a maturity level that is higher than its current maturity level, but that is not the highest maturity level in the hierarchy. Additionally, because some organizations may have previously developed a somewhat sophisticated change management structure, an organization's current maturity level may not necessarily be the lowest maturity level in the hierarchy.

In one embodiment, defining the one or more predefined maturity levels in the hierarchy may include constructing blueprints, lists, charts, diagrams, or other documents or resources for each of the plurality of predefined maturity levels. These resources may be utilized to provide a definition of the people, processes, technology, or other elements of a change management maturity level. In one embodiment, these resources may comprise process diagrams or flow charts that outline the specific process used in change management, including the specific personnel or departments within the organization that are involved in performing each of the processes. FIGS. 1A through 1G illustrate examples of change management process maturity level resources for Active, Efficient, Responsive, and Business-Driven maturity levels. For example, FIG. 1A illustrates a process blueprint 100*a* detailing actors 101, initial states 103, activities 105, decisions 107, and end states 109. FIG. 1B illustrates a list 100*b* detailing a standardized set of people, processes, technology, and other characteristics that comprise an organization operating at an Active change management maturity level. For example, FIG. 1B illustrates that end users and business unit owners are "people" involved in an Active change management maturity level. In one embodiment, these end users or business unit owners may be related to change management in that they may request changes to a software application. The major "processes" involved in an Active change management maturity level may be those involved in making changes to applications, i.e., the application development lifestyle. Additionally, quality control procedures may exist to test the consistency and effectiveness of these changes.

Figure 1C:
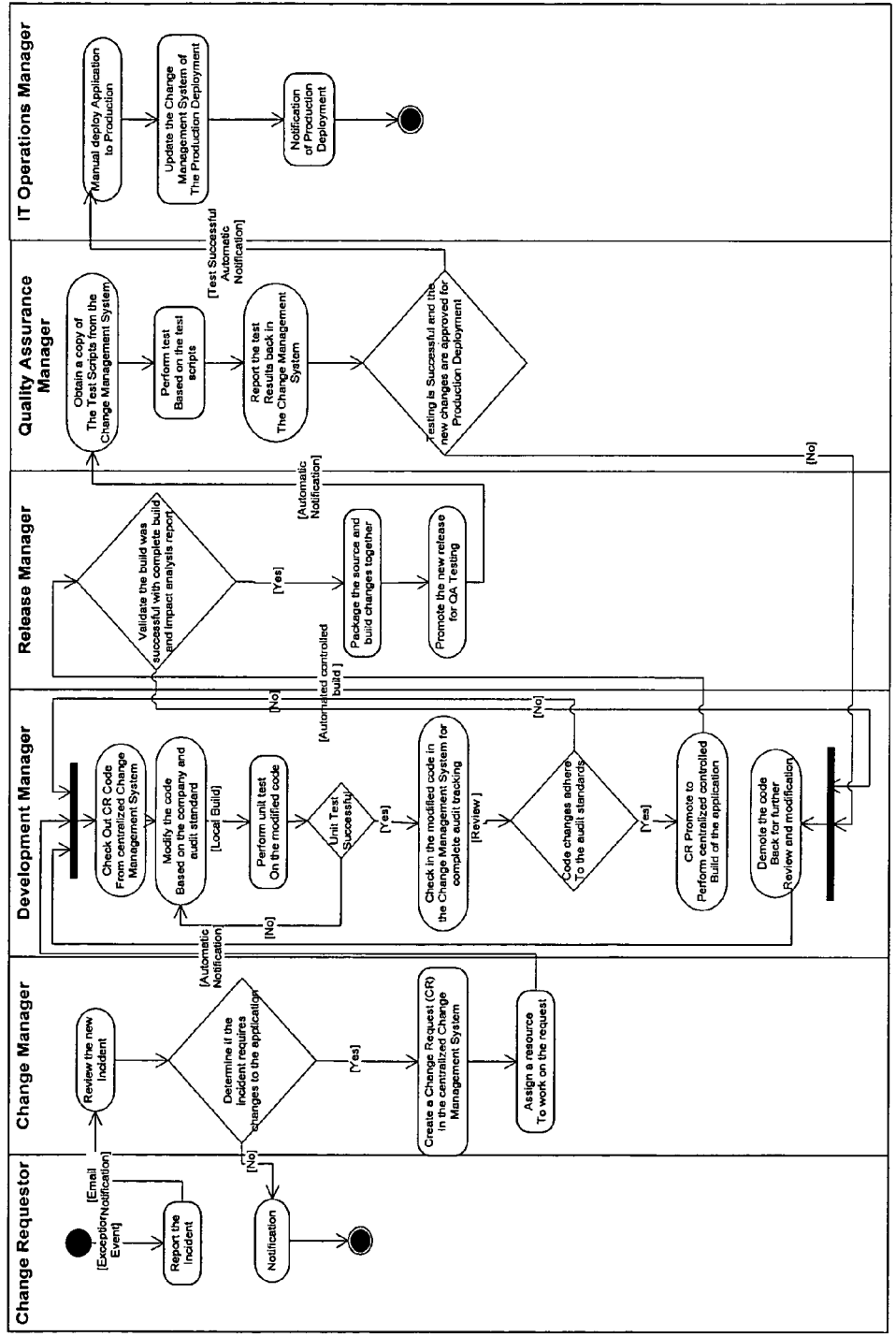
FIG. 1C illustrates a blueprint of a predetermined change management maturity level according to an embodiment of the invention.

Similarly, FIGS. 1C and 1D illustrate a process blueprint 100*c* and a list 100*d*, respectively, each containing elements for an Efficient change management maturity level. For example, FIG. 1D illustrates that in an Efficient change management maturity level, a designated role of "Change Manager" may be established, who has the responsibility for the effective functioning of the change process. The Change Manager may function as a "gate keeper" and may approve or reject changes based on reviewing various work product, including source code files, test cases, design documents, and/or other configuration items. A "Change Management Administrator" may also be established. The Change Management Administrator may be the technical counterpart of the Change Manager, and may administer the information technology systems that provide change management capability. The application development processes illustrated in FIG. 1B are further elaborated in FIG. 1D in accordance with the roles described.

Figure 1E:
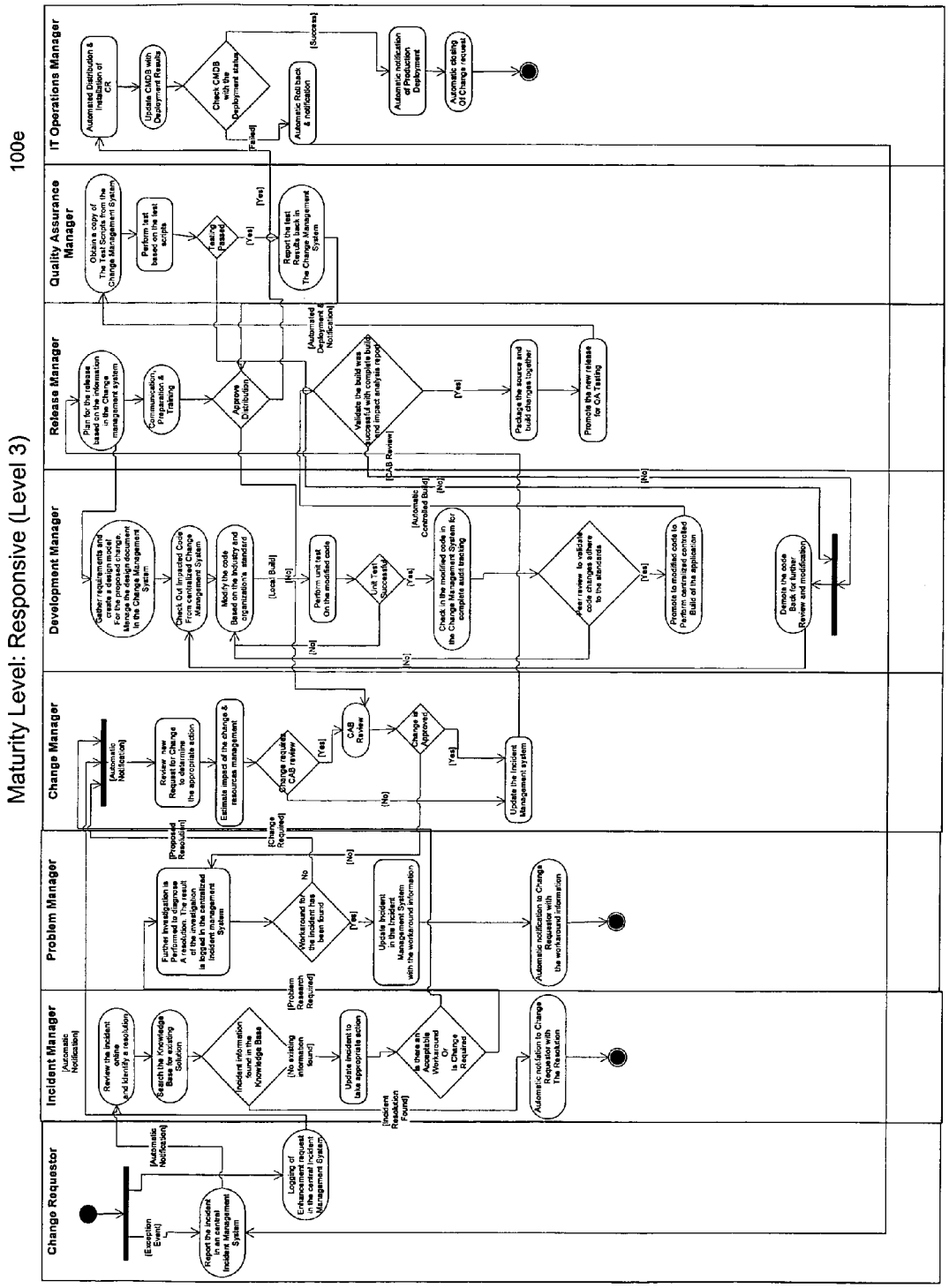
FIG. 1E illustrates a blueprint of a predetermined change management maturity level according to an embodiment of the invention.
Figure 1G:
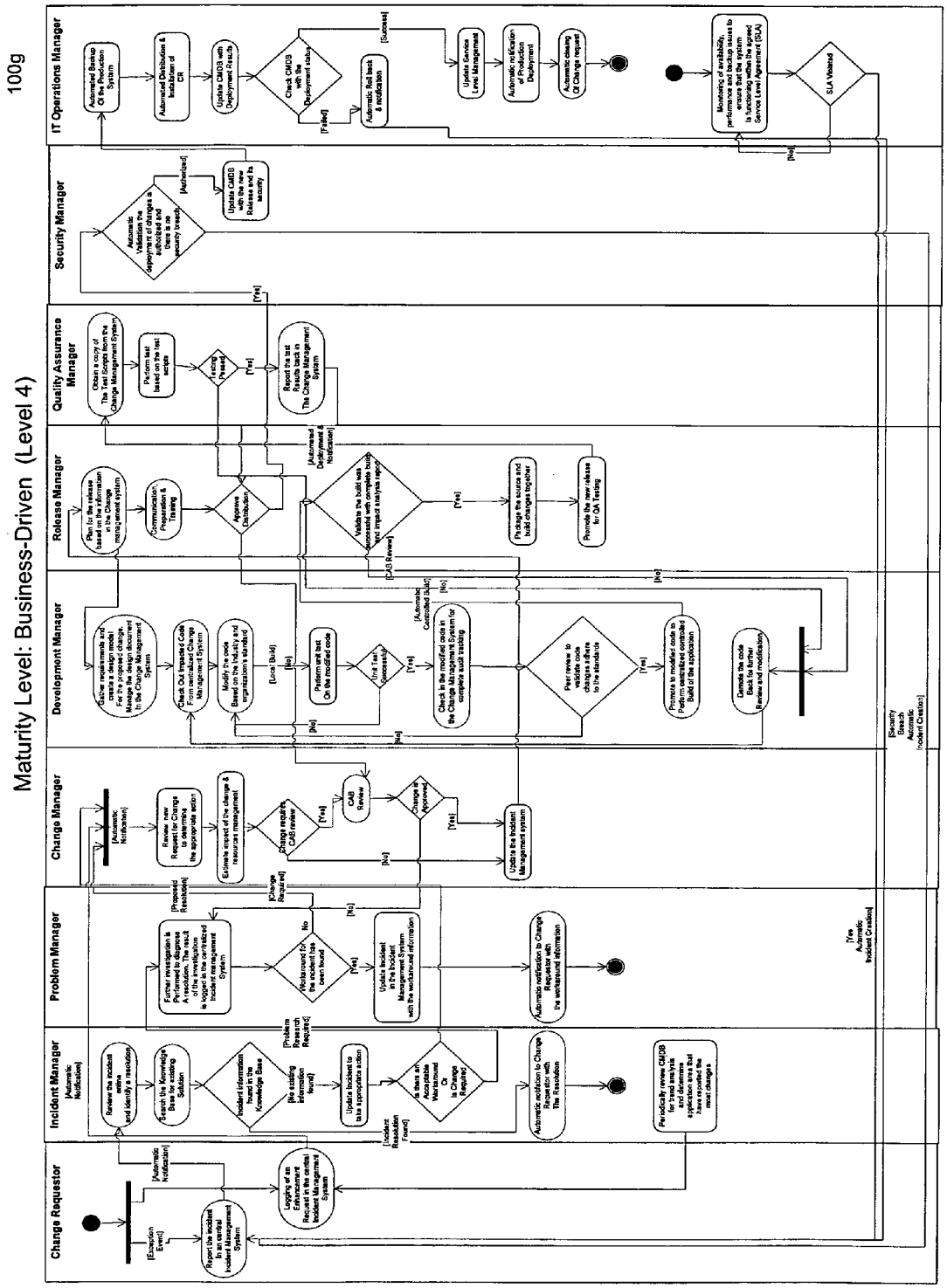
FIG. 1G illustrates a blueprint of a predetermined change management maturity level according to an embodiment of the invention.

FIGS. 1E and 1F illustrate a process blueprint 100*e* and a list 100*f*, respectively, each containing elements for a "Responsive" change management maturity level. FIGS. 1E and 1F build upon the core processes of FIGS. 1C and 1D, linking application development processes with "operations" processes. Operations processes are defined as those processes involved in the daily support of the information technology infrastructure. FIGS 1E and 1F identify the roles of "Incident Manager" (e.g., person or persons responsible for managing incidents) and release manager (e.g., person or persons responsible for managing a software release). Incident management is related to the management of service outages (i.e., incidents). Release management is the discipline of taking a set of enhancements or change requests and delivering them in a "software release" work product (the manifestation of all the enhancements). Finally, FIGS. 1G and 1H illustrate a process blueprint 100*g* and a list 100*h*, respectively, each containing elements for a Business-Driven change management maturity level.

Figure 2:
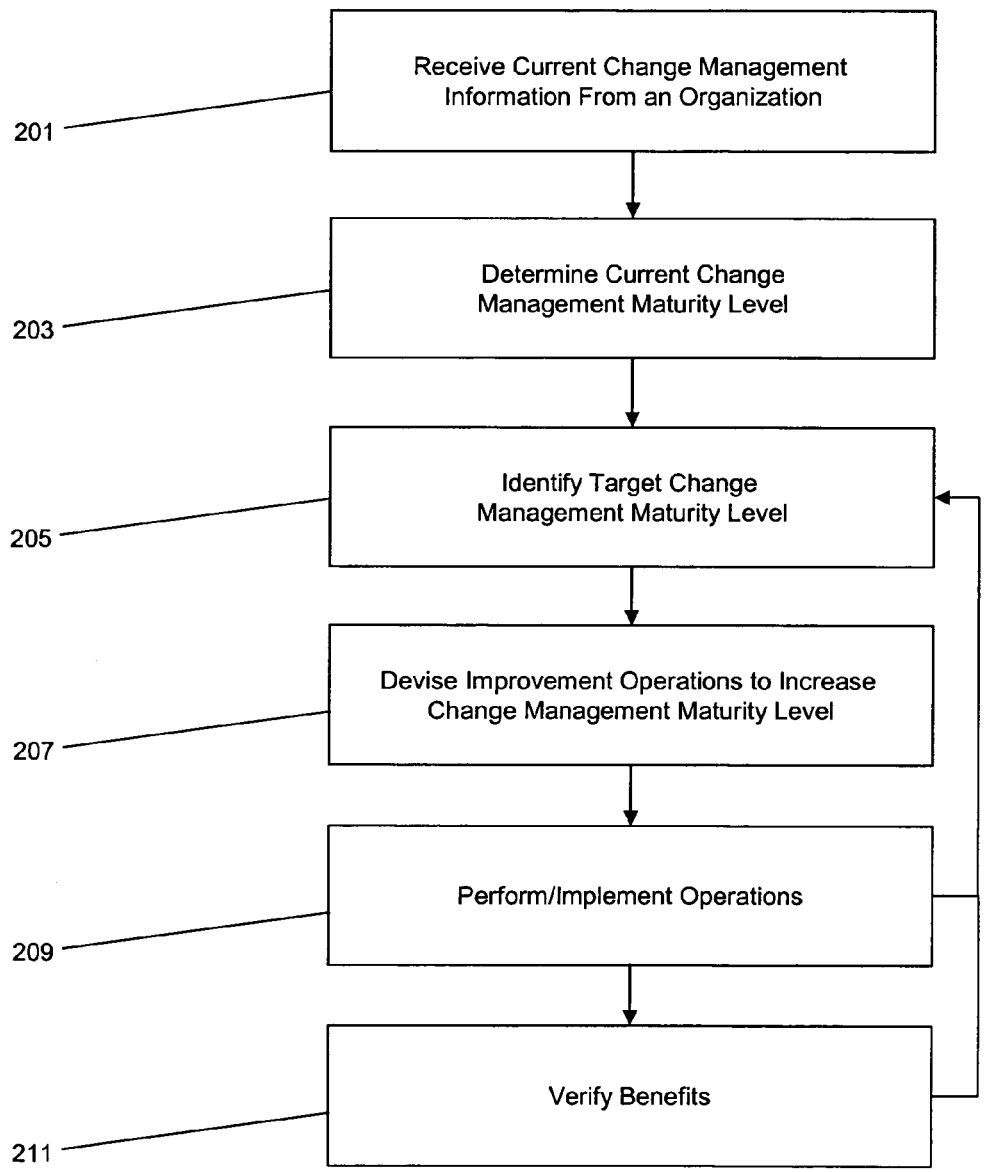
FIG. 2 illustrates a process for assessing and improving the change management maturity level of an organization according to an embodiment of the invention.

FIG. 2 illustrates a process 200 according to an embodiment of the invention, wherein an organization's change management maturity level may be assessed and improved. In an operation 201, current change management information may be gathered/received from the organization. In one embodiment, current change management information may include data regarding the current people, processes, technology and/or other elements of the organization's change management structure. For example, this data may include the organizational structure of the organization or one or more of its departments, the personnel within the organization, the customers of the organization, the software development processes of the organization, the change management process of the organization, software used by the organization, products and services utilized by the organization, the data security of the organization, other infrastructure of the organization, how these aforementioned elements relate to one another, or other data.

In an operation 203, a current change management maturity level may be identified for the organization using the current change management information. In one embodiment, the current change management maturity level may be identified using a "maturity model tool."

The maturity model tool may be constructed using the people, processes, technology, and/or other elements that comprise the plurality of predefined change management maturity levels. In some embodiments, the blueprints, charts, lists or other documentation or resources regarding each of the predefined maturity levels may be used to construct the maturity model tool. In one embodiment, a set of factors or questions (hereinafter "questions") may be derived for each of the predefined maturity levels and used as part of the maturity model tool. When these questions are answered or applied in light of the current change management information of an organization (e.g., the information obtained in operation 201), they may help elucidate the current change management maturity level of the organization. FIG. 3 illustrates an example of a maturity model tool.

For example, in one embodiment, answers to the questions of the maturity model tool may produce a sub-process score for each question. These individual maturity level scores may indicate the maturity level of a particular sub-process or sub-part of the organization's change management configuration. The questions used to produce these individual sub-process scores may be based on sub-process areas, which cover various industry standards and information technology governance requirements that a given organization should include.

In one embodiment sub-process, scores may range from 0 to 5, wherein a score of 5 may indicate that activities for this sub-process are "Optimized" and business driven (e.g., continuous process improvement is enabled by quantitative feedback from processes and from piloting innovative ideas and technologies). A score of 4 may indicate that the sub-process is "Managed" (e.g., detailed measurements of the information technology service delivery process and quality are collected; both the service processes and the delivered services are quantitatively understood and controlled). A score of 3 may indicate that the sub-process is "Defined" (e.g., the information technology service processes are documented, standardized, and integrated into standard service processes; all services are delivered using approved, tailored versions of the organization's standard service processes). A score of 2 may indicate that the sub-process is "Repeatable" (e.g., basic service management processes are established; the necessary discipline is in place to repeat earlier successes on similar services with similar service levels). A score of 1 may indicate that the sub-process is "Initial" (e.g., the information technology service delivery process is characterized as ad hoc and occasionally even chaotic; few processes are defined, and success depends on individual effort and heroics). A score of 0 may indicate the "Absence" of documented controls in place for the sub-process. One having ordinary skill in the art would recognize that the scoring system detailed herein is exemplary only. Other scoring systems, criteria, and/or labels may be used.

The resultant individual sub-process score may be indicative of an organization's experience in the particular sub-process area. The average of all of the individual sub-process scores provides an aggregate score at a maturity level. As such, the application of the questions may produce an aggregate score for the organization at each predefined maturity level. After completing the aggregate scores for each predefined maturity level, the maturity level of the organization may be determined. In some embodiments, this may be done by calculating an average score from the aggregate scores. Other calculation methods may be used to determine an organization's maturity level from a maturity model tool.

In one embodiment, the scores may reflect "process gaps," wherein scores are high at a higher maturity level but low at a lower maturity level. These process gaps may include situations wherein an organization is advanced in some of its sub-processes and not advanced in others. These process gaps must be addressed before the organization may move to a higher maturity level (e.g., identification of process gaps using the maturity model tool aids in identifying the one or more improvement operations for moving the organization to the target maturity level).

In some embodiments, additional or alternative methods may be used to identify the current maturity level of an organization. For example, the current change management information received from the organization (in operation 201) may be used to construct current change management blueprints charts, lists or other documents, or resources for the organization. These resources may detail the people, processes, technology, and/or other characteristics of the organization's current change management processes. These resources may then be compared to similar types of resources (e.g. blueprints, charts, lists, etc.) constructed for each of the predefined maturity levels in the hierarchy. The resources of the predefined maturity levels that most closely matches the resources representing the organization's current change management structure may aid in the selection of the current change management maturity level for the organization.

Once the current change management maturity level of an organization is established using the operations described above, an operation 205 may be utilized to identify a target change management process maturity level. In some embodiments, the target change management maturity level may include the maturity level immediately above the current maturity level in the hierarchy. For those organizations desiring to ultimately move up several maturity levels in the hierarchy, incremental movement from one maturity level to an immediately higher maturity level may be desirable, as incremental transitions may be more feasible or desirable. For example, an organization that is currently operating at an "Active" maturity level, may ultimately desire to move to a "Responsive" maturity level. However, an initial transition from Active to Efficient maturity levels may establish infrastructure and organizational precursors (e.g., people, processes, technology, etc.) that are beneficial in the further transition to the responsive maturity level. As such, the "target" maturity level, as the term relates to process 200 herein, refers to the maturity level to which the organization is immediately being shifted to, regardless of the ultimate level of maturity sought by the organization.

In some instances, however, the organization may be in a position such that transition directly to a maturity level that is several increments higher in the hierarchy is possible. As such, in some embodiments, the "target" maturity level may be several increments higher in the hierarchy than the current maturity level (e.g., the organization may be able to go from an Active directly to a Responsive maturity level).

In an operation 207, one or more improvement operations may be devised that, when performed, will raise the change management maturity level higher in the hierarchy of change management maturity levels. In some embodiments, the one or more improvement operations may initially be outlined in a solution architecture overview (SAO). The solution architecture overview may represent a high level outline of the one or more improvement operations. In some embodiments, a provider of change management improvement solutions (e.g., a service provider who directs, implements, oversees, or otherwise facilitates improvement of an organization's change management maturity level) may produce the solution architecture overview and present it to the organization as a preliminary plan for change management improvement. The organization may review the solution architecture overview and make a decision as to whether to proceed with change management improvement, whether to alter the one or more improvement operations reflected in the solution architecture overview, whether to refrain from change management improvement, or other courses of action. Once the solution architecture overview has been approved by the organization, a solution architecture specification (SAS) may be produced. The solution architecture specification may include the detailed documentation regarding the one or more improvement operations performed to achieve the target maturity level, including: the steps that are to be taken to achieve the target maturity level; the software and other products that are going to be used; how those products are going to be installed; the processes to be implemented; the impact on the. organization in terms of people, process and technology; or other information.

In some embodiments, the solution architecture overview and/or the solution architecture specification may be constructed using industry and other "best practices" guidelines to design the one or more improvement operations. In some embodiments, the "best practices" guidelines may include, for example, capability maturity model (CMM) guidelines, Software Engineering Institute (SEI) guidelines, Information Technology Infrastructure Library (ITIL) Guidelines, Control Objects for Information Technology (CoBIT) guidelines, or other standards or best practice schemes. In one embodiment, the solution architecture overview and/or the solution architecture specification may proactively identify documented improvements to the people, processes, technology, or other elements of the organization's change management.

Figure 4A:
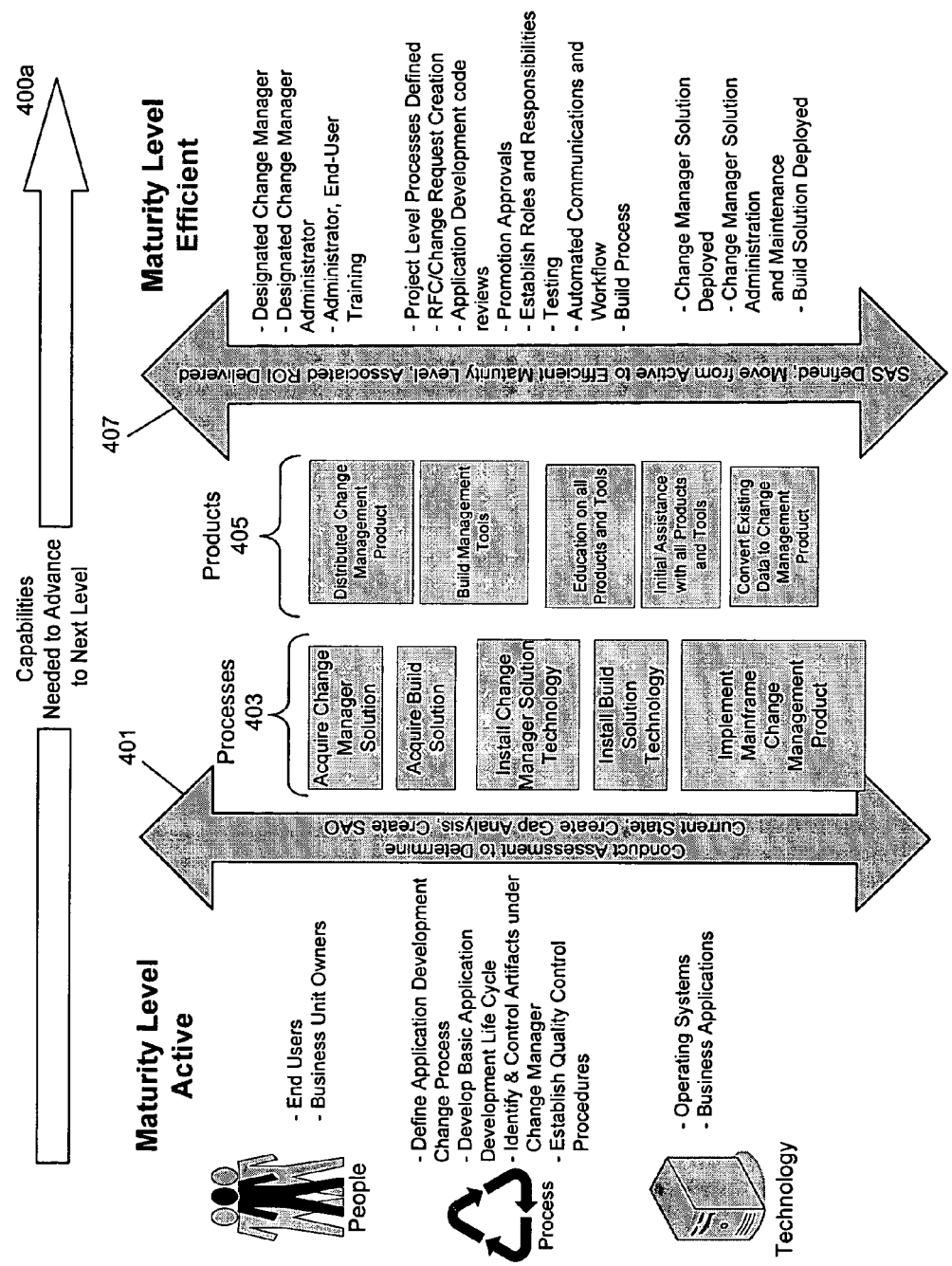
FIG. 4A illustrates a solution template according to an embodiment of the invention.

In some embodiments, the solution architecture overview and/or the solution architecture specification may be, at least in part, constructed using a predefined solution template that aids in formulating improvements, additions, or other changes to the people, processes, technology, or other elements of the organization. For example, FIG. 4A illustrates an example of a transition roadmap 400a that may be used as a solution template detailing the transition from an active maturity level to an efficient maturity level. Other documents or resources may be utilized as solution templates.

Transition roadmap 400a illustrates the elements of change management at the Active maturity level in terms of people, processes, and technology. For example, the people involved in an Active change management structure may include: 1) end users, 2) business unit owners, or other personnel. The processes involved an Active change management structure may include: 1) defining application development change processes, 2) developing basic application development life cycles, 3) identifying and controlling artifacts under change management, 4) establishing quality control procedures, and/or other processes. Finally, the technology involved in an Active change management structure may include: 1) operating systems, 2) business applications, or other technology. While not pictured in FIG. 4A, an organization operating at an Active change management maturity level may include other characteristics such as, for example, those illustrated in FIG. 1B, including reactive change management processes and unmanaged goals, change management processes that are not supported by tools, inconsistent output quality, manual/paper-based controls for change management, extended change management audit preparation time, multiple methods for application change, manual mapping of file changes to business requests, or other characteristics.

Transition roadmap 400a also illustrates improvement operations 401 that may be included in a transition roadmap detailing a transition from an Active to an Efficient maturity level. Improvement operations 401 may include performing an initial assessment of the organization's current state, creating gap analysis (the difference between the current state and what is needed to get to the target maturity level), creating the solution architecture overview, or performing other steps. Operations 401 may serve to define/identify the one or more improvement operations in terms of a set of processes 403 and a set of products 405. As illustrated, moving from an Active to an Efficient change management maturity level may involve certain change management products (for example, AllFusion Endeavor™ Change Manager, AllFusion Harvest Change Manager, both available from Computer Associates, Inc.), or other technology, acquisition of this technology, installation of this technology, education and other aid regarding this technology, and/or other products, software, or services. A set of improvement operations 407 may then be utilized to complete the shift from Active to Efficient change management maturity levels. Improvement operations 407 may include defining a solution architecture specification (SAS), implementing the solution defined in the SAS, which in turn delivers the return on investment associated with the Efficient change management maturity level.

Transition roadmap 400a also illustrates the elements of change management at the resultant Efficient maturity level in terms of people, processes, and technology. For example, the people involved in an Efficient change management structure may include: 1) a designated change manager, 2) a designated change management administrator, 3) an end user training administrator, and/or other personnel or groups thereof. The processes involved in an Efficient change management structure may include: 1) defining project level processes, 2) creating requests for change (RFC)/change requests, 3) reviewing application development code, 4) promotion approval processes, 5) establishing roles and responsibilities, 6) testing processes, automated communications and workflow processes, 7) build processes, and/or other processes. The "technology" involved in an Efficient change management structure may include: 1) change management solution deployment software/hardware, 2) change management solution administration and maintenance software/hardware, 3) build solution deployment software/hardware, and/or other technology.

Figure 4B:
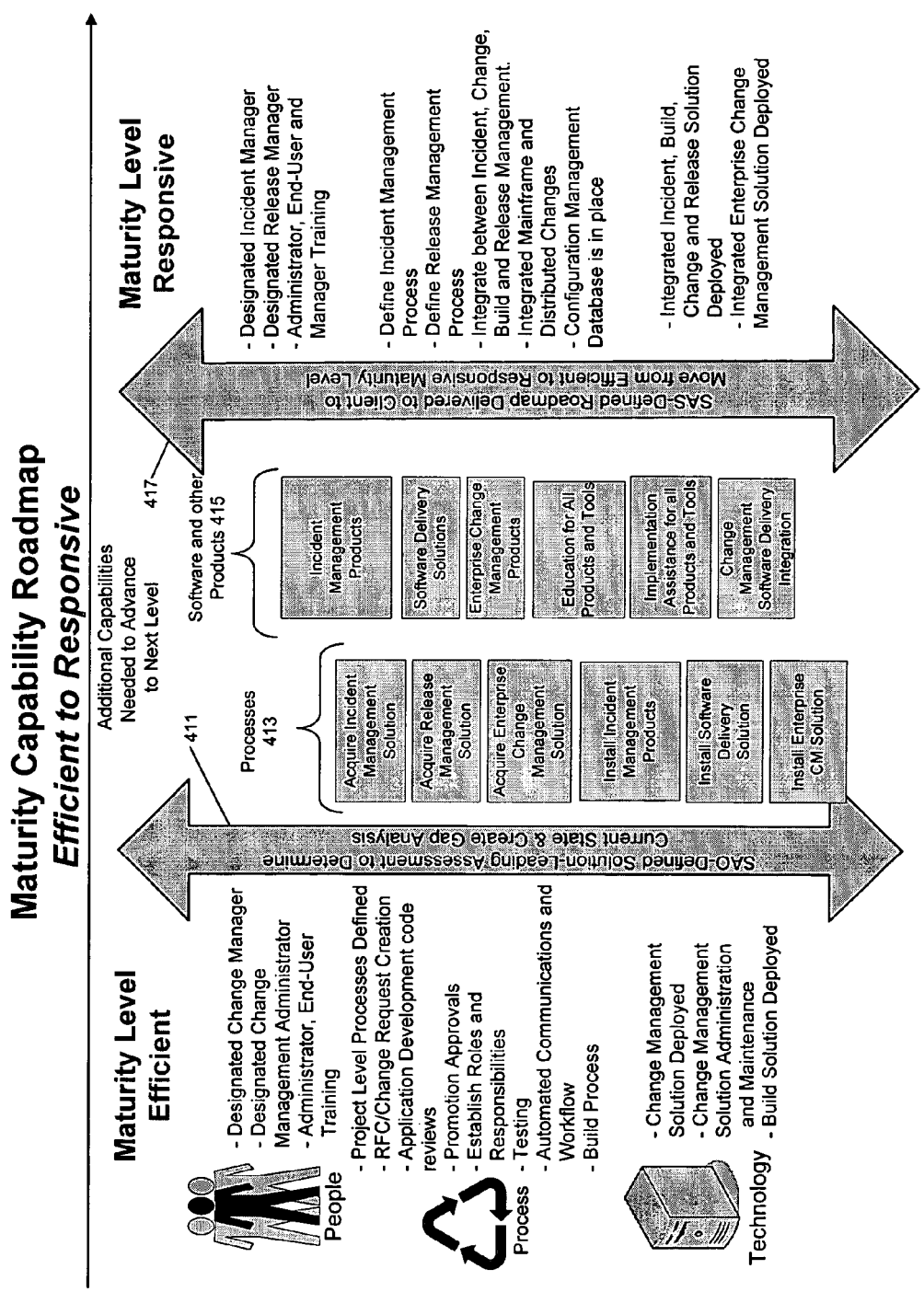
FIG. 4B illustrates a solution template according to an embodiment of the invention.

FIG. 4B illustrates a transition roadmap 400b for shifting an organization from an Efficient to a Responsive change management maturity level. Transition roadmap 400b illustrates the elements of change management at the Efficient maturity level in terms of people, processes, and technology. While not pictured in FIG. 4B, an organization operating at an Efficient change management maturity level may include other characteristics such as, for example, those illustrated in FIG. 1D, including application change being tied to business drivers or business requirements, change requests that are flexible (individual changes can be moved, promoted or demoted, throughout the application development lifecycle; changes that can be grouped and moved as a release), change management controls that are automated and approvals/notifications are electronic, managing builds (executables) that are tied to source code changes automatically, application development that is repeatable (consistent processes are embedded into the development team), or other characteristics.

Transition roadmap 400*b* also illustrates improvement operations 411 that may be included in a transition roadmap detailing the transition from an Efficient to a Responsive maturity level. Improvement operations 411 may include performing a solution leading assessment of the organization to determine the organization's current state, creating gap analysis (the difference between the current state and what is needed to get to the target maturity level), creating the solution architecture overview, or performing other steps. Operations 411 may serve to define/identify the one or more improvement operations in terms of a set of processes 413 and a set of products 415. As illustrated, moving from an Efficient to an Active change management maturity level may involve certain change management products, incident management products, and/or software delivery products (for example, AllFusion™ Enterprise Workbench Change Manager, Unicenter™ Service Desk, and Unicenter™ Software Delivery, all available from Computer Associates, Inc.), or other technology, acquisition of this technology, installation of this technology, education and other aid regarding this technology, and/or other products, software, or services. A set of improvement operations 417 may then be utilized to complete the shift from Efficient to Responsive change management maturity levels. Improvement operations 417 may include defining a solution architecture specification, implementing the solution defined in the SAS, which in turn delivers the return on investment associated with the Responsive change management maturity level.

Transition roadmap 400*b* also illustrates the elements of change management at the resultant Responsive maturity level in terms of people, processes, and technology. For example the people involved in a Responsive change management structure may include: 1) a designated incident manager, 2) a designated release manager, 3) an end-user and manager training administrator, and/or other personnel or groups thereof. The processes involved in a Responsive change management structure may include: 1) defining incident management processes, 2) defining release management processes, integrating incident management, change management, build management, and release management 3) integrated mainframe and distributed changes, 4) putting a configuration management database in place, and/or other processes. The "technology" involved in a Responsive change management structure may include: 1) integrated incident, build, change, and release solutions, integrated change management solutions, and/or other technology.

Figure 4C:
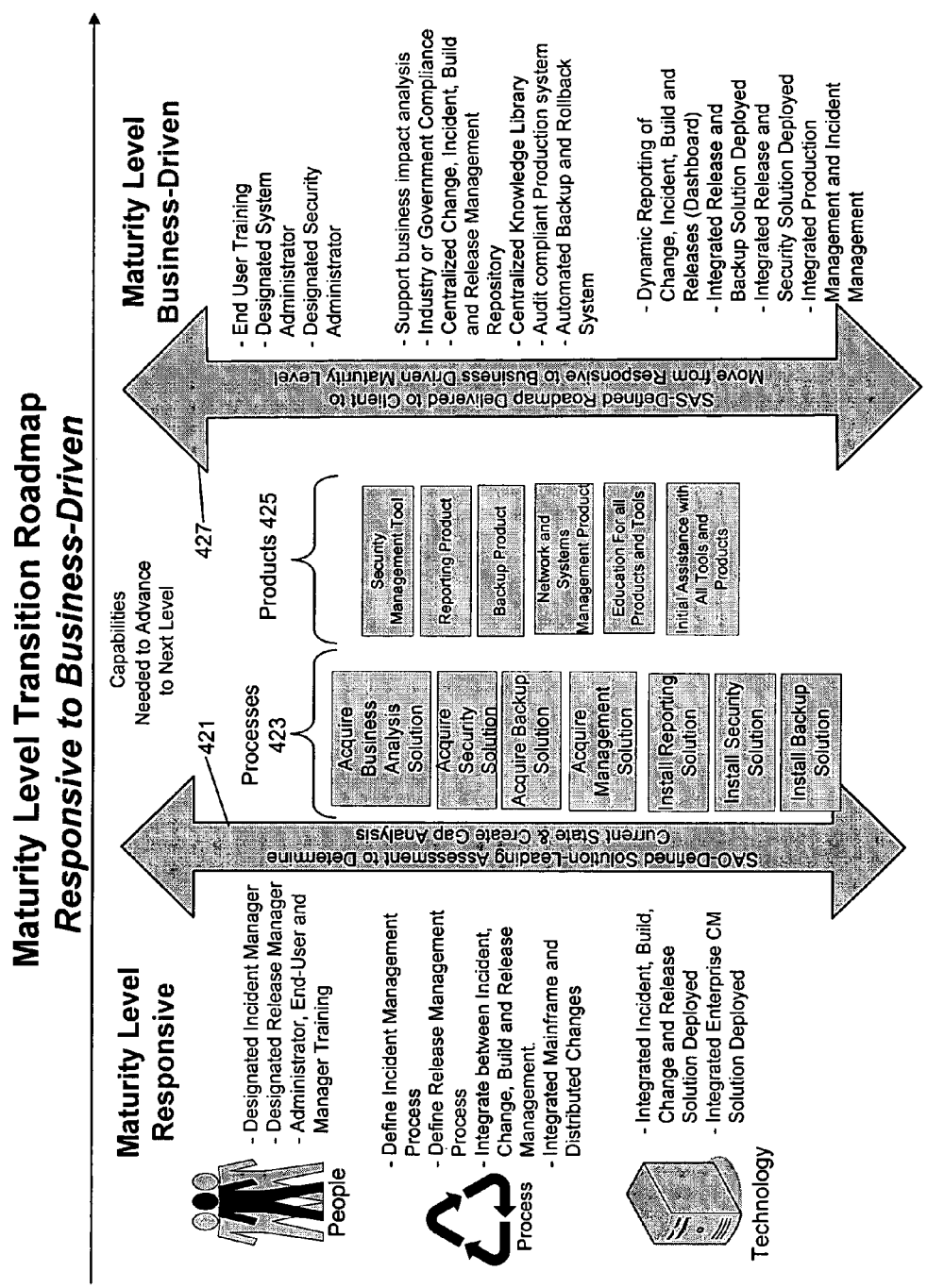
FIG. 4C illustrates a solution template according to an embodiment of the invention.

While FIGS. 4A and 4B illustrate transition roadmaps used as solution templates for shifting an organization from Active to Efficient and Efficient to Responsive maturity levels, respectively, FIG. 4C illustrates a corresponding transition roadmap 400*c* for shifting an organization from a Responsive to a Business-Driven change management maturity level.

Transition roadmap 400*c* illustrates the elements of change management at the Responsive maturity level in terms of people, processes, and technology. While not pictured in FIG. 4C, an organization operating at a Responsive change management maturity level may include other characteristics such as, for example, those illustrated in FIG. 1F, including a consistent development methodology that exists throughout the entire organization (including mainframe and distributed change management); "best in class" service support processes enabling faster response to outage requests; integrated development and operations lifecycles; automated deployments that speed up the release management process and that are scalable for enterprise levels; change management that enables the organization to support compressed application development lifecycles; or other characteristics.

Transition roadmap 400*c* also illustrates improvement operations 421 that may be included in a transition roadmap from a Responsive to a Business-Driven maturity level. Improvement operations 421 may include performing a solution leading assessment of the organization to determine the organization's current state, creating a gap analysis (the difference between the current state and what is needed to get to the target maturity level), creating the solution architecture overview may be created, or performing other steps. Operations 421 may serve to define/identify the one or more improvement operations in terms of a set of processes 423 and a set of products 425. As illustrated, moving from a Responsive to a Business-Driven change management maturity level may involve certain security management products, reporting tools, backup products (for example, eTrust™ Access Control, CleverPath Forest & Trees™ Dashboard, and Brightstor™ Storage Manager, all available from Computer Associates, Inc.) or other technology, acquisition of this technology, installation of this technology, education and other aid regarding this technology, and/or other products, software, or services. A set of improvement operations 427 may then be utilized to complete the shift from Responsive to Business-Driven change management maturity levels. Improvement operations 427 may include defining a solution architecture specification, implementing the solution defined in the SAS, which in turn delivers the return on investment associated with the Business-Driven change management maturity level.

Transition roadmap 400*c* also illustrates the elements of change management at the resultant Business-Driven maturity level in terms of people, processes, and technology. For example the people involved in a Business-Driven change management structure may include: 1) an end user training department, 2) a designated change management system administrator, 3) a designated change management security administrator, and/or other personnel or groups thereof. The processes involved in a Business-Driven change management structure may include: 1) supporting business impact analyses, 2) supporting compliance with government or industry standards, 3) supporting centralized change, incident, build, and release management, 4) supporting a centralized knowledge library, 5) supporting an audit compliant production system, 6) supporting an automated backup and rollback system, and/or other processes. Finally, the "technology" involved in a business-driven change management structure may include: 1) technology for dynamic reporting of change, incident, build, and releases (through a dashboard program, for example), 2) integrated release and backup solution, 3) integrated release and security solution, 4) integrated production management and incident management, and/or other technology. While not pictured in FIG. 4C, an organization operating at a Business-Driven change management maturity level may include other characteristics such as, for example, those illustrated in FIG. 1H, including, a change management system that is suitable for highly secure environments, a change management system that supports "high availability," and service level agreements (service level monitoring for availability and automatic fault identification and logging; real time status on all changes), automatic provisioning/recovery/rollback of changes during deployment, or other characteristics.

Figure 5:
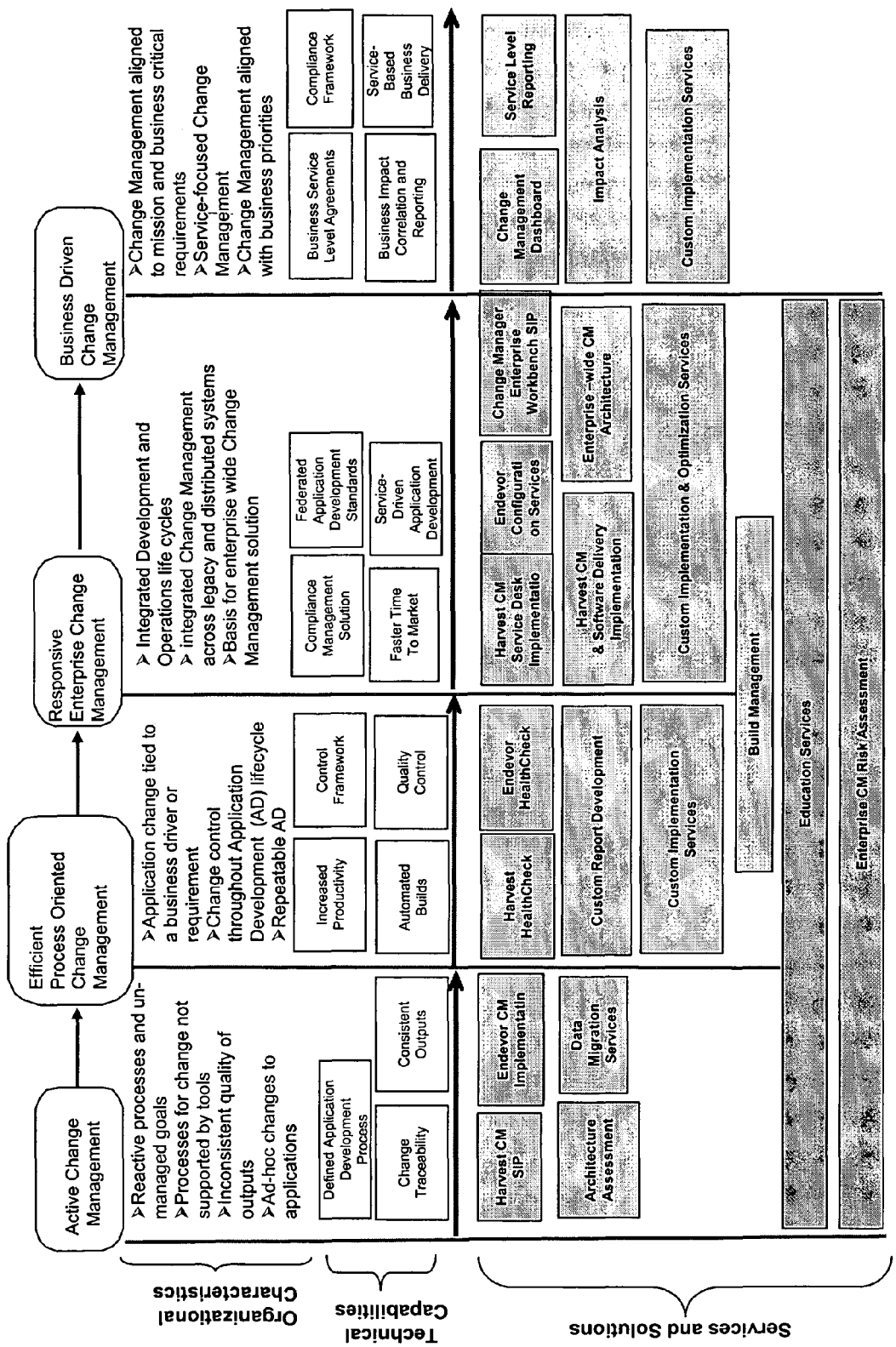
FIG. 5 illustrates a stepwise solution according to an embodiment of the invention for shifting an organization from an active maturity level to a business-driven maturity level.

FIG. 5 is an overall flow diagram illustrating incremental movement between Active, Efficient, Responsive, and Business-Driven maturity levels in terms of exemplary organizational characteristics of each maturity level, exemplary technical capabilities at each maturity level, and exemplary processes, services, software, and/or other products or solutions that may be used to implement a shift to higher maturity levels.

In some embodiments, the solution architecture overview and/or the solution architecture specification may include additional elements such as, for example, detailed descriptions of the operations to be performed, a model of the organization operating within the target change management maturity level, analysis of the impact of the implementation of the one or more improvement operations on the organization, one or more measurable critical success factors, or other elements.

As each organization's current change management structure may be unique (e.g. advanced in some areas, deficient in others, deficient across the board). Thus, the one or more improvement operations needed to bring organizations to higher maturity levels may vary. The specific change management information gleaned from operation 201 and the application of that information to the maturity model tool may produce a different set of improvement operations for bringing two separate organizations to the same maturity level.

Referring back to FIG. 2, in an operation 209, the one or more improvement operations may be performed (i.e., the solution designed in the SAO and SAS may be implemented), ultimately shifting the organization towards the higher change management maturity level. These operations may be preformed by personnel or infrastructure internal to the organization, by external personnel or infrastructure (e.g., consultants or other service providers), or by a combination of both.

In an operation 211, the purported benefits of the organization's ascension to a higher maturity level may be verified post-implementation. In one embodiment, this verification may be accomplished using the previously defined critical success factors and/or purported documented improvements, which may be measured after one or more of the one or more operations have been performed. These critical success factors or improvements may be designed to determine the relative success or failure of the shift to the higher change management maturity level.

Examples of critical success factors defined for an organization moving to a Business-Driven change management maturity level may include reduction in build errors by 95% (caused due to wrong version of code being compiled), reduction in time spent in software access and retrieval by 75%, reduction in time for retrofit of changes by 80%, reduction in effort required for migration of changes by 40%, reduction in time spent creating build process by 50%, reduction in time required to distribute changes from one platform to another by 66%, reduction in new incidents being created (due to missing source code) by 99%, or other factors. The measurement of these and other factors or metrics may provide a verification of the success of the shift to the target maturity level. Other verification methods may be employed.

In some embodiments, one or more of the operations of process 200 may be repeated to shift the organization to an even higher change management maturity level. Thus, in an embodiment of the invention involving predefined change management maturity levels (e.g., Active, Efficient, Responsive, and Business-Driven), the invention may provide a stepwise solution for an organization to ultimately improve its change management from a primitive or outdated structure to a best-in-class configuration. For example, this stepwise solution may take the organization incrementally from an Active maturity level, to an Efficient maturity level, to a Responsive maturity level, to a Business-Driven maturity level. For each shift in maturity levels, iterations of some or all of the operations in process 200 may be utilized to move up incremental maturity levels until the ultimately desired maturity level is reached.

Figure 6:
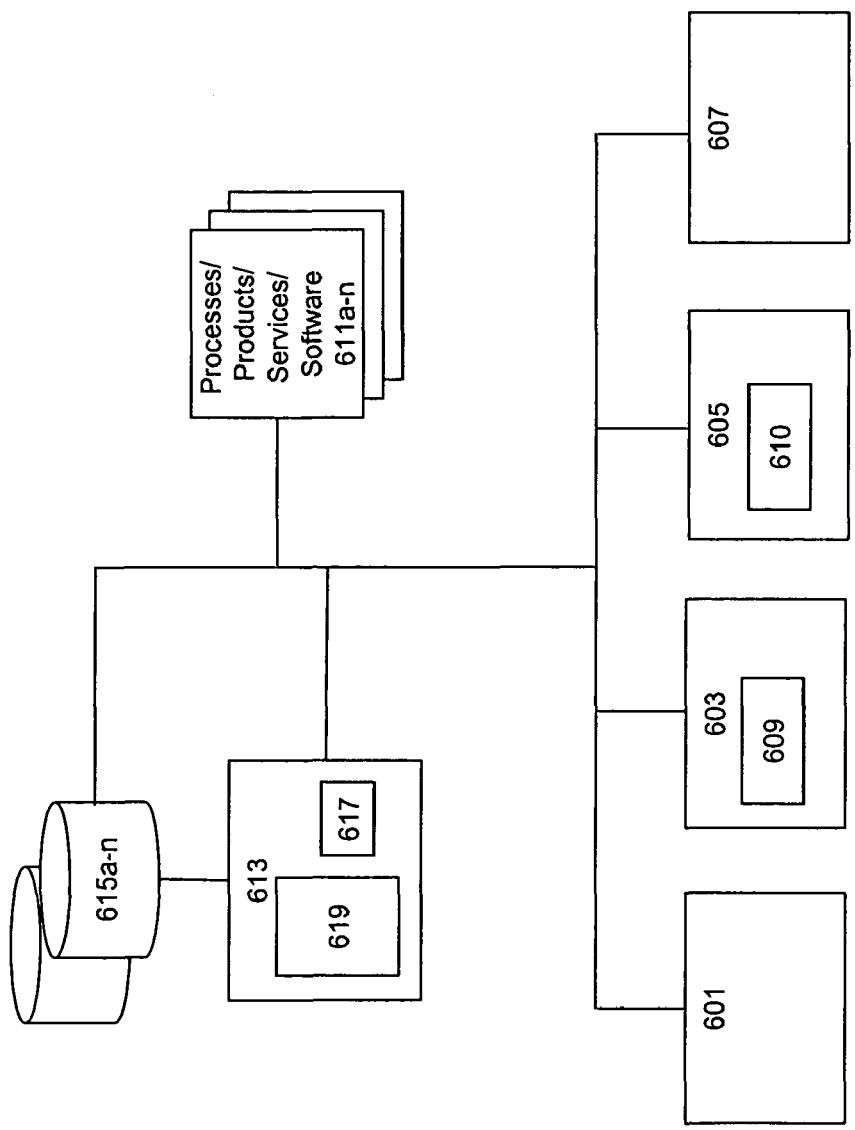
FIG. 6 illustrates a system according to an embodiment of the invention for assessing and shifting maturity levels.

According to an embodiment of the invention illustrated in FIG. 6, the invention provides a system 600 that enables performance of the processes, operations and/or features herein, including assessing the current change management maturity level of an organization, devising strategies for improving the maturity level, and implementation of those strategies to improve the maturity level of the organization. System 600 may include a information manager 601, an assessment manager 603, a planning manager 605, an implementation manager 607, and/or other elements.

In one embodiment, information manager 601 may comprise one or more software modules, a person or group of people, a system or part thereof (including, but not limited to, a computer system), and/or other elements. Information manager 601 may be adapted to receive and/or store information, including current change management information, regarding one or more organizations or to perform other processes, operations or features described herein.

In one embodiment, an assessment manager 603 may comprise one or more software modules, a person or group of people, a system or part thereof (including, but not limited to, a computer system), and/or other elements. Assessment manager 603 may be adapted to utilize information or data, including an organization's current change management information, to assess the current change management maturity level of the organization, and/or to perform other operations, processes or features described herein. In some embodiments, assessment manager 603 may enable the determination of a plurality of change management maturity levels. In some embodiments, assessment manager 603 may arrange the maturity levels in a hierarchy. In some embodiments, assessment manager 603 may construct blueprints, lists, charts or other representations or informational resources regarding one or more of the plurality of maturity levels. In some embodiments, assessment manager 603 may construct, include, and/or utilize a maturity model tool 609.

In one embodiment, planning manager 605 may include one or more software modules, a person or group of people, a system or part thereof (including, but not limited to, a computer system), and/or other elements. Planning manager 605 may be adapted to devise one or more improvement operations that, when implemented, will shift an organization to a higher change management maturity level and/or to perform other processes, operations, or features described herein. In one embodiment, planning manager 605 may enable construction and/or utilization of a solution architecture overview (SAO), a solution architecture specification (SAS) 610, a solution template, a prospective model of an organization under a higher maturity level, performance metrics, and/or other tools. In one embodiment, planning manager 605 may identify one or more products/processes/services/software 611*a-n* for use in the one or more improvement operations.

In one embodiment, implementation manager 607 may include one or more software modules, a person or group of people, a system or part thereof (including, but not limited to, a computer system), and/or other elements. Implementation manager 607 may be adapted to perform the one or more improvement operations, implement the solution defined by the SAO and/or the SAS, measure and evaluate performance metrics, and/or to perform other processes, operations or features described herein. In some embodiments, implementation manager 607 may utilize and/or implement one or more processes/products/services/software 611*a-n* to shift an organization's change management maturity level.

In some embodiments, one or more of the elements of system 600 may include and/or utilize a computer system 613, data storage devices 615*a-n*, or other computer-implemented elements. In some embodiments, computer system 613 may include a processor 617 and a control application 619. In some embodiments, control application 619 may comprise a website or computer application and may include and or operate one or more software modules which cause processor 617 to perform one or more processes, operations, or features described herein.

Those having skill in the art will appreciate that the invention described herein may work with various system configurations. Accordingly, more or less of the aforementioned system components may be used and/or combined in various embodiments. It should also be understood any software modules and/or software applications that may utilized to accomplish the functionalities described herein may be implemented in various combinations of hardware and/or firmware, in addition to, or instead of, software.

In one embodiment, the invention may include a computer readable medium containing instructions that, when executed by at least one processor, cause the at least one processor to enable and/or perform the features, functions, and or operations of the invention as described herein, including the any or all of the operations of the processes described in specification or the figures, and/or other operations.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

We claim:

1. A method of improving change management in an organization, wherein change management includes processes controlling changes to an information technology infrastructure of the organization, the method performed by a processor configured to perform a plurality of operations, the plurality of operations comprising:

defining, via the processor, a plurality of change management maturity levels, wherein the plurality of change management maturity levels are organized in a hierarchy from a lowest change management maturity level to a highest change management maturity level, wherein each of the plurality of change management maturity levels defines a set of processes for change management within a hypothetical organization operating at the respective change management maturity level, and wherein the set of processes for each of the change management maturity levels in the hierarchy includes processes related to a change requestor, a change manager, a software development manager, and an information technology operations manager;

receiving, at the processor, current change management information regarding an organization whose current change management processes are to be improved;

determining, by the processor, a current change management maturity level for the organization from the plurality of pre-defined change management maturity levels;

determining, by the processor, a target change management maturity level for the organization from the plurality of pre-defined change management maturity levels, the determined target change management maturity level being an improvement over the current change management maturity level and being at a level higher than the current change management maturity level in the hierarchy; and devising, by the processor, one or more improvement operations that, when performed, shift the organization from the current change management maturity level to the target change management maturity level.

2. The method of claim 1, further comprising performing one or more of the one or more improvement operations to shift the organization from the current change management maturity level to the target change management maturity level.

3. The method of claim 1, wherein the current change management information includes information regarding one or more of the current people, current processes, or current technology associated with the organization's current change management processes.

4. The method of claim 1, wherein said determining a current change management maturity level includes using a maturity model tool applied to the received current change management information, and wherein the maturity model tool comprises a plurality of assessment questions for each of the plurality of pre-defined change management maturity levels in the hierarchy.

5. The method of claim 4, wherein each of the plurality of assessment questions, when answered in light of the received current change management information, yields an aggregate maturity level score for each of the plurality of pre-defined change management maturity levels, and wherein the current change management maturity level for the organization is determined based on the aggregate maturity level score.

6. The method of claim 1, wherein defining a plurality of change management maturity levels comprises:

constructing one or more model blueprints for each of the plurality of change management maturity levels in the hierarchy, wherein each of the one or more model blueprints defines a set of people, processes, and technology associated with the hypothetical organization operating at the respective change management maturity level.

7. The method of claim 6, wherein determining a current maturity level further comprises:

constructing a workflow blueprint for the organization based on the received current change management information;

comparing the workflow blueprint to the one or more model blueprints; and selecting one of the plurality of pre-defined change management maturity levels in the hierarchy whose model blueprints most closely match the workflow blueprint as the current change management maturity level for the organization.

8. The method of claim 1, wherein devising one or more improvement operations further comprises:
   identifying the target change management maturity level from the plurality of pre-defined change management maturity levels, wherein the target change management maturity level is associated with a standard set of processes and products for shifting a hypothetical organization from the current change management maturity level to the target change management maturity level; and
   deriving the one or more improvement operations from the standard set of processes and products.

9. The method of claim 1, wherein devising one or more improvement operations further comprises creating an operational model of the organization that predicts the function of the organization at the target change management maturity level.

10. The method of claim 9, wherein creating an operational model further comprises defining one or more measurable critical success factors that provide a measure of success of the one or more improvement operations in shifting the organization to the higher change management maturity level when the one or more improvement operations are performed.

11. The method of claim 10, further comprising performing one or more of the one or more improvement operations to shift the organization from the current change management maturity level to the target change management maturity level, and wherein performing one or more of the one or more improvement operations further comprises measuring the one or more measurable critical success factors.

12. The method of claim 1, wherein the set of processes for the lowest change management maturity level in the hierarchy includes processes related to the change requestor, the change manager, the software development manager, and the information technology operations manager.

13. The method of claim 12, wherein the processes related to the change requestor comprises notifying the change manager of an incident; wherein the processes related to the change manager comprises determining if the incident requires changing software code, and if so, assigning a resource to change the software code; wherein the processes related to the software development manager comprises changing and testing the software code; and wherein processes related to the information technology operations manager comprises deploying the changed software code to production.

14. The method of claim 1, wherein the set of processes for at least one change management maturity level higher in the hierarchy than the lowest change management maturity level includes processes related to the change requestor, the change manager, the software development manager, a software release manager, a quality assurance manager, and the information technology operations manager.

15. The method of claim 14, wherein the processes related to the change manager comprises determining if the incident requires changes to an application, and if so, creating a request on a centralized change management system, and assigning a resource to change a software code of the application; wherein the processes related to the software development manager comprises changing and testing the software code retrieved from the centralized change management system; wherein processes related to the software release manager comprise validating that a build of the software code was successful; and wherein processes related to the quality assurance manager comprises testing the build, and if the build is not successful, returning the build to the software development manager.

16. The method of claim 1, wherein the set of processes for at least one change management maturity level lower in the hierarchy than the highest change management maturity level in the hierarchy includes processes related to the change requestor, an incident manager, a problem manager, the change manager, the software development manager, a software release manager, a quality assurance manager, and the information technology operations manager.

17. The method of claim 16, wherein the processes related to the incident manager comprises reviewing an incident, searching a knowledge base to identify a resolution and attempting to identify a workaround if no resolution is found; and wherein the processes related to the problem manager comprise implementing an identified workaround, and elevating the incident to the change manager if the identified resolution does not resolve the incident.

18. The method of claim 1, wherein the set of processes for the highest change management maturity level in the hierarchy includes processes relating to the change requester, an incident manager, a problem manager, the change manager, the software development manager, a software release manager, a quality assurance manager, a security manager, and the information technology operations manager.

19. A system for improving change management in an organization, wherein change management includes processes controlling changes to an information technology infrastructure of the organization, the system comprising:
   a processor configured to execute one or more computer readable instructions, wherein the computer readable instructions when executed by the processor cause the processor to:
      define a plurality of change management maturity levels, wherein the plurality of change management maturity levels are organized in a hierarchy from a lowest change management maturity level to a highest change management maturity level, wherein each of the plurality of change management maturity levels defines a set of processes for change management within a hypothetical organization operating at the respective change management maturity level, and wherein the set of processes for each of the change management maturity levels in the hierarchy includes processes related to a change requestor, a change manager, a development manager, and an information technology operations manager;
      receive current change management information regarding an organization whose current change management processes are to be improved;
      determine a current change management maturity level for the organization from the plurality of pre-defined change management maturity levels;
      determine a target change management maturity level for the organization from the plurality of pre-defined change management maturity levels, the target change management maturity level being an improvement over the current change management maturity level and being at a level higher than the current change management maturity level in the hierarchy, and
      devise one or more improvement operations that, when performed, shift the organization from the current change management maturity level to the target change management maturity level.

20. The system of claim 19, further comprising the processor configured to perform one or more of the one or more improvement operations to shift the organization from the current change management maturity level to the target change management maturity level.

21. The system of claim 19, wherein the current change management information includes information regarding one or more of the current people, current processes, or current technology associated with the organization's current change management processes.

22. The system of claim 19, wherein a maturity model tool applied to the received current change management information is used to determine the current change management maturity level, and wherein the maturity model tool comprises a plurality of assessment questions for each of the plurality of pre-defined change management maturity levels in the hierarchy.

23. The system of claim 22, wherein each of the plurality of assessment questions, when answered in light of the received current change management information, yields an aggregate maturity level score for each of the plurality of pre-defined change management maturity levels, and wherein the current change management maturity level for the organization is determined based on the aggregate maturity level score.

24. The system of claim 19, wherein defining a plurality of change management maturity levels comprises the processor configured to:
construct one or more model blueprints for each of the plurality of change management maturity levels in the hierarchy, wherein each of the one or more model blueprints defines a set of people, processes, and technology associated with the hypothetical organization operating at the respective change management maturity level.

25. The system of claim 24, wherein the processor is further configured to:
construct a workflow blueprint for the organization based on the received current change management information;
compare the workflow blueprint to the one or more model blueprints; and
select one of the plurality of pre-defined change management maturity levels in the hierarchy whose model blueprints most closely match the workflow blueprint as the current change management maturity level for the organization.

26. The system of claim 19, wherein the processor is further configured to:
identify the target change management maturity level from the plurality of pre-defined change management maturity levels, wherein the target change management maturity level is associated with a standard set of processes and products for shifting a hypothetical organization from the current change management maturity level to the target change management maturity level; and
derive the one or more improvement operations from the standard set of processes and products.

27. The system of claim 19, wherein the processor is further configured to create an operational model of the organization that predicts the function of the organization at the target change management maturity level.

28. The system of claim 27, wherein creation of an operational model further comprises defining one or more measurable critical success factors that provide a measure of success of the one or more improvement operations in shifting the organization to the higher change management maturity level when the one or more improvement operations are performed.

29. The system of claim 28, further comprising the processor configured to perform one or more of the one or more improvement operations to shift the organization from the current change management maturity level to the target change management maturity level, wherein performing one or more of the one or more improvement operations further comprises the processor configured to measure the one or more measurable critical success factors.

* * * * *